(12) United States Patent
Woolfe et al.

(10) Patent No.: US 7,894,111 B2
(45) Date of Patent: Feb. 22, 2011

(54) METHOD AND SYSTEM TO DETERMINE PREFERRED COLOR MANAGEMENT SETTINGS FOR PRINTING DOCUMENTS

(75) Inventors: Geoffrey J. Woolfe, Canandaigua, NY (US); Jennifer C. Perotti, Pittsford, NY (US); Mary Ann Sprague, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 739 days.

(21) Appl. No.: 11/640,688

(22) Filed: Dec. 18, 2006

(65) Prior Publication Data

US 2008/0143738 A1   Jun. 19, 2008

(51) Int. Cl.
*G03F 3/08* (2006.01)
(52) U.S. Cl. .................. 358/518; 358/1.15; 358/1.9; 358/527; 715/961
(58) Field of Classification Search .............. 358/1.9, 358/1.13, 1.15, 296, 518, 527; 715/961; 719/321
See application file for complete search history.

(56) References Cited

U.S. PATENT DOCUMENTS

| | | | | |
|---|---|---|---|---|
| 4,308,582 A | * | 12/1981 | Berger | 715/236 |
| 5,751,430 A | * | 5/1998 | Koike | 358/296 |
| 6,148,346 A | * | 11/2000 | Hanson | 719/321 |
| 6,803,921 B1 | | 10/2004 | Balasubramanian et al. | |
| 7,023,448 B1 | * | 4/2006 | Danciu | 345/589 |
| 2005/0219561 A1 | * | 10/2005 | Haikin | 358/1.9 |
| 2006/0001931 A1 | * | 1/2006 | Danciu | 358/527 |
| 2006/0098220 A1 | * | 5/2006 | Oh et al. | 358/1.9 |
| 2006/0170993 A1 | * | 8/2006 | Jacob | 358/518 |
| 2007/0019236 A1 | * | 1/2007 | Sando | 358/1.15 |

* cited by examiner

*Primary Examiner*—Kimberly A Williams
(74) *Attorney, Agent, or Firm*—Fay Sharpe LLP

(57) ABSTRACT

The presently described embodiments generate a single job that tests multiple image path parameter combinations. The user first selects the part of the document that will be used for the test run. The system then determines all the available image path control parameters and settings that are compatible with the selected document parts. The system builds a menu, and the user chooses the image path control parameters and settings combinations that are to be tested. The user then sends the job to the printer which prints the selected parts of the documents using each of the selected image path parameter combinations. Appropriate labels are included in the printed output so the user can easily identify the combination that delivers the most satisfactory results.

26 Claims, 4 Drawing Sheets

EMULATION AND SOURCE PROFILE BATCH TEST
202

EMULATION OR SOURCE

- ☒ SWOP COATED — 204
- ☒ SWOP UNCOATED — 206
- ☒ DIRECT 1-GEN3 — 208
- ☒ FOGRA — 210
- ☒ JAPAN COLOR — 212
- ☒ EUROSCALE — 214

[SELECT ALL] — 216    [SELECT NONE] — 218

RENDERING INTENT — 220

- ☒ PERCEPTUAL — 222
- ☒ RELATIVE COLORIMETRIC — 224
- ☒ ABSOLUTE COLORIMETRIC — 226
- ☒ SATURATION — 228

[SELECT ALL] — 230    [SELECT NONE] — 232

METHOD AND SYSTEM TO DETERMINE PREFERRED COLOR MANAGEMENT SETTINGS FOR PRINTING DOCUMENTS

BACKGROUND

One of the goals of digital color management technology is to allow customers to unambiguously communicate their color reproduction requirements to print operators. In order to achieve this, digital color management systems require that a color space that is used to encode digital document files be communicated to the print operator. This is typically accomplished by tagging the digital document or individual elements within the document with an ICC color management profile. However, documents supplied to print operators as digital files are frequently not tagged with an ICC profile and, as a result, print operators are unsure as to how a document should appear when printed. In the absence of the required color management information, customer requirements can be difficult to determine. Some customers will communicate their requirements by supplying the print operator with an aim print or proof to be matched. If no proof is supplied, print operators will try to produce a print that their customer will find pleasing and acceptable. This is largely a matter of aesthetic judgment on the part of the print operator.

This lack of specific color management information requires digital press operators to guess at the correct color requirements. This is often done by testing various color management assumptions to determine which gives the most satisfactory results. These various color management assumptions can be tested by the choice of control parameter settings in the raster image processing (RIP) operation. The RIP operation translates document specifications in a page description language (PDL) such as Postscript and Adobe PDF into a set of color bitmap separations that are images of the document pages. It is an application that runs on a computer commonly called a Digital Front End (DFE) in the digital printing business. One of the more commonly used RIP control parameters is the choice of printer emulation. Other important control parameters might include rendering intents and GCR (gray component replacement) settings.

Regardless of whether the print operator is attempting to match a customer-supplied proof or simply produce a pleasing result, a range of different settings of the control parameters at the RIP will generally need to be tested before a successful outcome is achieved. Unfortunately, there is no simple or intuitive way for the print operator to determine the combination of settings that will produce the most desirable result. Accordingly, print operators will usually make a guess at what they think are the most likely RIP settings that will result in desirable color reproduction. They will then proceed to test many combinations of these settings until satisfactory results are obtained. This process can require a large number of single-print tests and is quite time consuming as each test must be manually set up and initiated on the DFE.

U.S. Pat. No. 6,803,921 discloses one approach to improving the aforementioned printing process. This patent document discloses a softcopy proofing system in which an image or document of unknown colorimetry can be soft proofed iteratively using a range of different source profiles, rendering intents and color adjustments. This disclosed procedure is similar to, but more application specific than, the time consuming, manual process described above as the current test methodology being used by pre-press operators, except it is performed using a softcopy proofing device rather than on the actual press. Furthermore, it only considers color management source profiles and rendering intents and does not apparently relate to the full range of control parameters available on the printer RIP. The approach disclosed in U.S. Pat. No. 6,803,921 does not apparently provide the capability to make direct side by side comparisons of the effects of changing various settings on actual prints. Color gamut mismatch between the softcopy proofing device and the actual press and the difference between the typical viewing environments for softcopy displays and actual prints further evidences the application specific nature of this method.

BRIEF DESCRIPTION

In one aspect of the presently described embodiments, the method comprises providing a first interface operative to receive a first user selection of a plurality of control parameters from a plurality of control parameters available in the rendering device, providing at least a second interface operative to receive a plurality of settings for at least one of the control parameters selected in the first interface, constructing selected combinations of the control parameters and settings, processing the document for each combination to obtain a plurality of processed documents, and, printing the processed documents.

In another aspect of the presently described embodiments, the plurality of control parameters includes one or more control parameters related to the color interpretation of document source or emulation data.

In another aspect of the presently described embodiments, the plurality of control parameters includes one or more control parameters related to rendering intents.

In another aspect of the presently described embodiments, the constructing is based on a full factorial design.

In another aspect of the presently described embodiments, the constructing is based on a fractional factorial design.

In another aspect of the presently described embodiments, the method further comprises developing descriptive text corresponding to each of the combinations and inserting the corresponding descriptive text into or adjacent to, each of the processed documents.

In another aspect of the presently described embodiments, the document is an image.

In another aspect of the presently described embodiments, the processing is performed on a selected region of a document.

In another aspect of the presently described embodiments, the method further comprises suppressing text in the document during the processing.

In another aspect of the presently described embodiments, the method further comprises extracting the plurality of available control parameters and plurality of available control parameter settings from the document rendering device.

In another aspect of the presently described embodiments, the method further comprises storing the control parameter selection and the control parameters settings selection.

In another aspect of the presently described embodiments, the method further comprises allowing the selection of discrete settings of a control parameter through the second interface.

In another aspect of the presently described embodiments, the method further comprises allowing selection of a range of settings for a continuous control parameter through the second interface.

In another aspect of the presently described embodiments, the system comprises a first interface operative to receive a first user selection of a plurality of control parameters from a plurality of control parameters available in the rendering device, at least a second interface operative to receive a plurality of settings for at least one of the control parameters selected in the first interface a first processing module operative to construct selected combinations of the selected control parameters and settings, a second processing module operative to process the document for each said combination to obtain a plurality of processed documents, and, a print engine operative to print the processed documents.

In another aspect of the presently described embodiments, a first control parameter relates to the color interpretation of document source or emulation data.

In another aspect of the presently described embodiments, the plurality of control parameters includes one or more control parameters related to rendering intents.

In another aspect of the presently described embodiments, the first module is operative to construct combinations using a full factorial design.

In another aspect of the presently described embodiments, the first module is operative to construct combinations using a partial factorial design.

In another aspect of the presently described embodiments, the processing module is operative to develop a descriptive text corresponding to each of the combinations and inserting the corresponding descriptive text in, or adjacent to each of the processed images.

In another aspect of the presently described embodiments, the document is an image.

In another aspect of the presently described embodiments, the processing is performed on a selected region of a document.

In another aspect of the presently described embodiments, the second processing module is operative to suppress text in the document.

In another aspect of the presently described embodiments, the system further comprises a means for extracting the plurality of available control parameters and the plurality of available control parameter settings from the document rendering device.

In another aspect of the presently described embodiments, the system further comprises libraries storing the first control parameter selections and the control parameter settings selections.

BRIEF DESCRIPTION OF THE DRAWINGS

FIG. 3 is an illustration of an interface according to the presently described embodiments; and, FIG. 4 is a flow chart illustrating a method according to the presently described embodiments.

DETAILED DESCRIPTION

The presently described embodiments relate to a method and system for generating a single test run that, in a single job, tests multiple control parameters such as emulations/source profiles or rendering intents and multiple settings for those control parameters. For example, emulations/source profile settings may include SWOP, FOGRA and others. Further, in most RIP systems, the rendering intent control parameter can take values of 'Perceptual', 'Relative Colorimetric', 'Absolute Colorimetric' or 'Saturation'. Some RIPs provide additional settings beyond these four examples. It should be appreciated the concept could be extended to other control parameters such as to test multiple levels of Grey Component Replacement (GCR) or Under Color Removal (UCR), or even to test different halftone screens.

The system works by first allowing a user to select a document, image or part of the document or image that will be used for a test run. Then, the system determines all the control parameters, e.g. emulations and source profiles, available on the printer or DFE that are compatible with the selected material. For each control parameter, the system determines the available settings. This information is used to build a menu for the user to choose the control parameters and control parameter settings that are to be tested. When these selections have been made, the user sends the job to the printer that prints the selected material using various combinations of the control parameters and the control parameter settings selected. Appropriate annotation is included in the printed output so the user can easily identify the combination that delivers the most satisfactory results.

Figure 1:
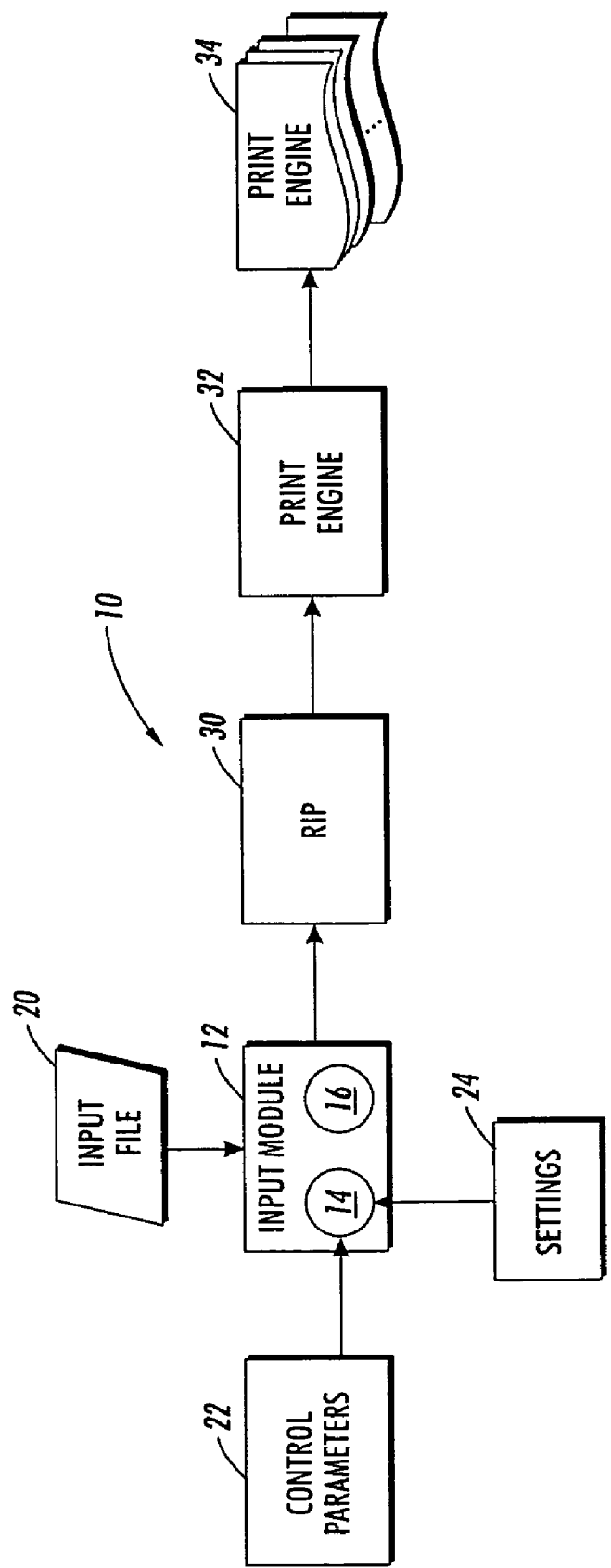
FIG. 1 is an illustration of a system into which the presently describe embodiments may be incorporated.

Referring now to FIG. 1, a system into which the presently described embodiments may be incorporated is illustrated. As shown, the system 10 includes an input module 12. The input module 12 comprises an interface 14 and a combination module 16. The interface 14 may take a variety of forms, e.g. it may comprise multiple interfaces or screens, and will be described in greater detail in connection with FIGS. 2(*a*)-2(*c*) and FIG. 3, while the combination module 16 includes routines operative to conduct a factorial analysis on various datasets to construct different combinations of the elements with those datasets, as will be described in greater detail below. It should be appreciated that the components of the input module 12 may reside in a variety of locations on or in connection with the printer being used. For example, the input module 12 may reside in a digital front end (DFE), the raster image processor (RIP), or in an upstream software package such as a workflow management software package. The interface 14 and the combination module 16 may also be suitably distributed within the print system.

The input module 12 receives information from a variety of sources. Among these, an input file 20 is provided to the input module 12. The input file may correspond to a document, an image, a region of a document or image, etc. In any event, the input file 20 will, in at least one form, comprise image data including color space information for a particular image that is sought to be rendered.

Control parameters, such as a source color space profile, emulation or rendering intents stored in a control parameter library 22, are also provided to the input module 12. Example settings for the types of emulation or source profiles that may be included within a settings module 24 include: SWOP coated, SWOP Uncoated, Direct I-Gen3, FOGRA, and Japan Color. It should be appreciated that these emulations or source profiles may be manually provided to the input module 12 or extracted by the input module 12 from the raster image processor (RIP) of the printer, or image rendering device, that is being used in the print process. Of course, it should be understood that other control parameters may be used. In this regard, the control parameters may vary by geographic region (e.g., in Europe, Euroscale may be listed). Those noted only serve as examples.

Control parameter settings for rendering intents are stored in a settings module 24 and provided to the input module 12. Examples of rendering intent settings include: perceptual, relative calorimetric, absolute calorimetric, and saturation. Like the source color space and emulation profiles noted above, the rendering intents may be manually provided to the input module 12 or extracted by the input module 12 from the raster image processor (RIP) of the printer, or image rendering device, that is being used in the print process. Of course, it should be understood that other control parameter settings may be used. Those noted only serve as examples.

It should be understood that the library 22 and settings module 24 may take a variety of configurations. For example, the library 22 may maintain the control parameter listing which is indexed to the settings module 24. Accordingly, the library 22 and the settings module 24 may be combined into one element. In any case, it should be appreciated that the control parameters listed and the settings discussed are merely examples.

Also included in the system 10 is a Raster Image Processor RIP 30 connected to a print engine 32. The print engine 32 produces an output document 34. The RIP 30 converts documents specified in a page description language into an image in a form that is suitable for the print engine. The RIP 30 generally incorporates functions including, but not limited to, color management and halftone screening. The print engine 32 may take a variety of known forms provided that it is able to receive the data contemplated by the presently described embodiments. It should also be understood that the output documents 34 may vary in number, dependent on the number of combinations that are constructed in accordance with the presently described embodiments.

Figure 2:
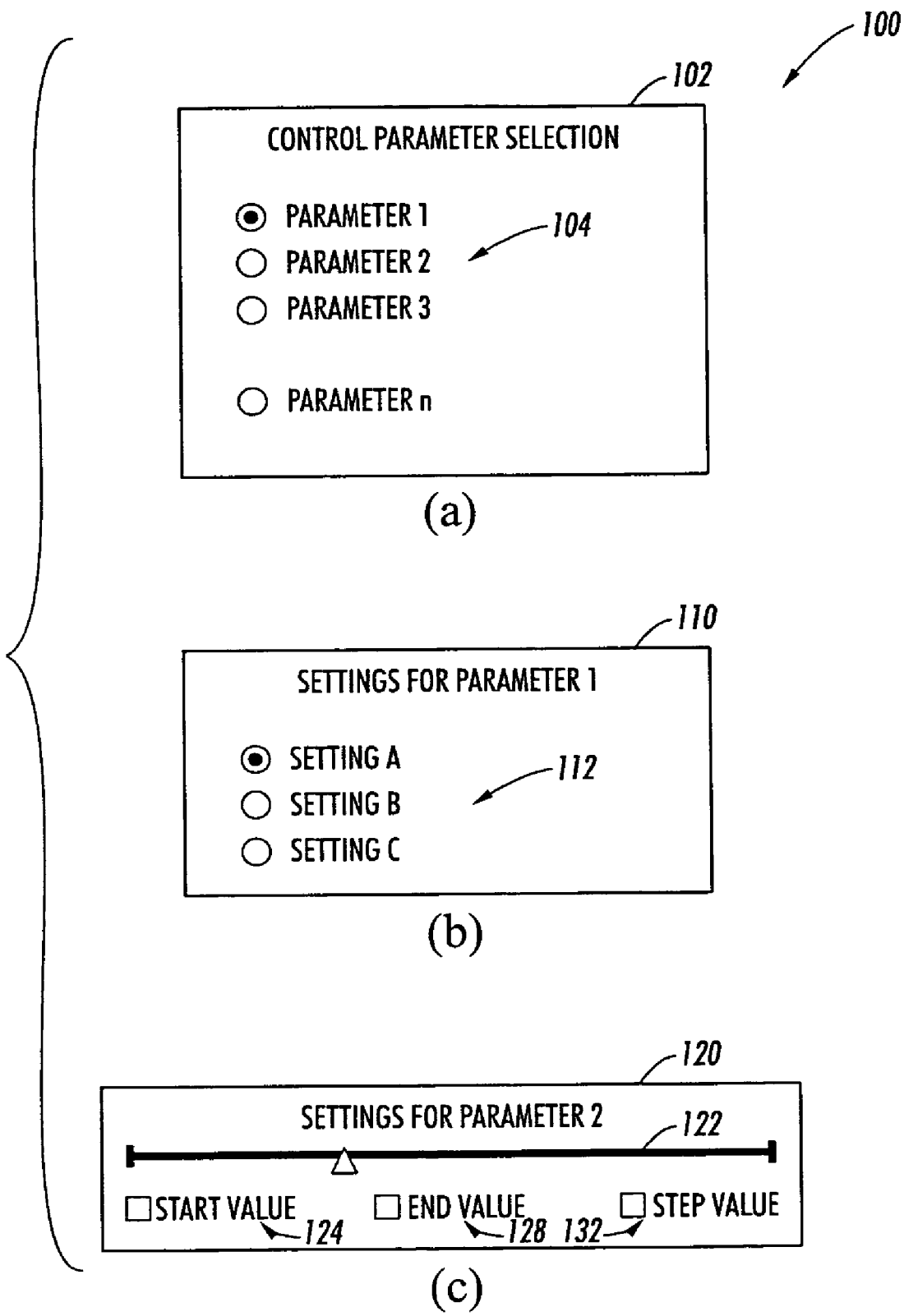
FIGS. 2(*a*)-2(*c*) are illustrations of interface(s) according to the presently described embodiments.

With reference to FIGS. 2(*a*) through 2(*c*), a plurality 100 of example interfaces is illustrated. As shown in FIG. 2(*a*), an interface 102 includes parameters 104. These parameters may be selected by a user using any known methods (e.g. highlighting a marker such a circle, checking a box, filling in a circle, . . . etc. using a mouse or pointer). FIG. 2(*b*) illustrates another interface 110. The interface 110 corresponds to a selection of Parameter 1 using the interface 102 of FIG. 2(*a*). As shown, the interface 110 includes a plurality of settings 112 from which a user may select. The settings 112 are settings for control Parameter 1 which can accept discrete values. FIG. 2(*c*) illustrates yet another interface 120. The interface 120 corresponds to a selection of Parameter 2 using the interface 102 of FIG. 2(*a*). The settings of interface 120 are configured for control Parameter 2 which can accept continuous values. As shown, the interface 120 includes a sliding scale 122, a start value register 124, an end value register 128 and a step value register 132, allowing a user input parameters for desired continuous data. It should be appreciated that the additional interfaces may also be provided for all other parameters listed in interface 102. Of course, while shown as separate interfaces or screens, it will be understood that all of these component could likewise be provided on a single interface or screen. Moreover, the interfaces are merely exemplary in nature, so they may take a variety of forms and perform a variety of functions.

Referring now to FIG. 3, another example interface 200 is illustrated. The interface 200 takes a slightly different form than the interface 100 inasmuch as the interface 200 includes both the control parameters and settings in a single interface or screen. As will be described below, the interface 200 is manipulated by users to designate settings of certain control parameters so that appropriate combinations can be constructed and used in the adjustment process of printing.

The interface 200 includes the control parameters emulation or source profile (field 202) and rendering intent (field 220). As noted above, the source or emulation parameter may accept a variety of available settings (204, 206, 208, 210, 212, 214). These available settings each have a region or a button available on the interface 200. In this regard, the interface 200 includes settings such as SWOP coated 204, SWOP Uncoated 206, Direct I-Gen3 208, FOGRA 210, Japan Color 212, and Euro-scale region 214. Also shown are buttons or regions 216 and 218 for selecting all or none of the other regions. The regions or buttons may be manipulated by using a mouse or keyboard control.

The interface 200 also includes a rendering intent control parameter field 220. This field includes a variety of different rendering intent settings. Each such rendering intent setting has associated therewith a region in the interface 200. In this regard, a perceptual region 222, a relative colorimetric region 224, an absolute colorimetric region 226 and a saturation region 228 are provided. Also shown are buttons or regions 230 and 232 for selecting all or none of the other regions. The regions or buttons may be manipulated by using a mouse or keyboard control.

It should be appreciated that the interface may take a variety of suitable forms. It is contemplated that any such form will take into account that the presently described embodiments use combinations of the elements of more than one field of information to make multiple adjustments to a process, e.g. the contemplated printing process, in a single job routine.

Figure 4:
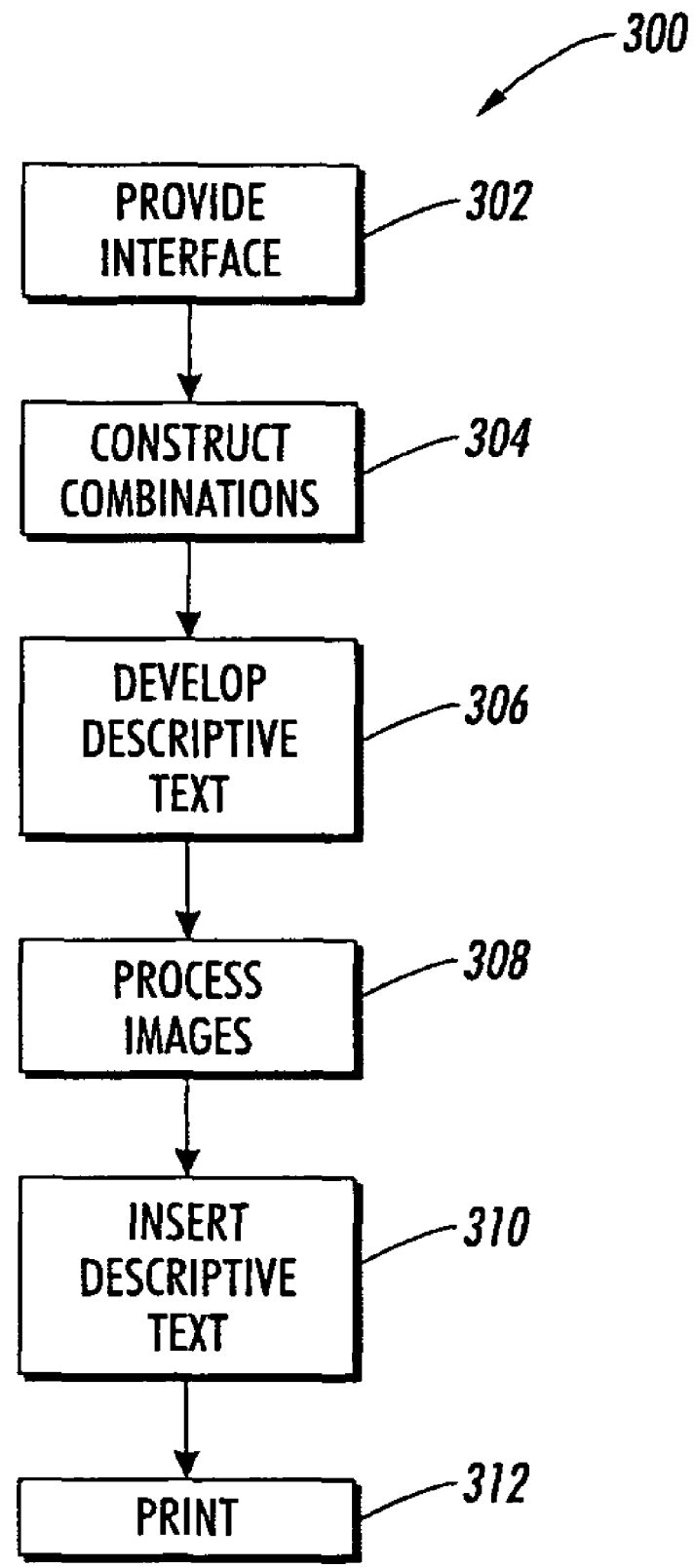

Referring to FIG. 4, a method 300 illustrating one method according to the presently described embodiments is illustrated. It should be understood that the method(s) of the presently described embodiments may be implemented using a variety of hardware configurations and/or software techniques. Further, the routines implementing the method may reside in a central location or distributed in the system, as is appropriate. As shown, initially, an interface is provided (at 302). In at least one form, the interface is operative to receive a first user selection of at least one control parameter from a plurality of control parameters available to the image rendering device being used and also operative to receive a second user selection of at least one control parameter setting from a plurality of settings available to the image rendering device. It should be understood that the input module may check the appropriate folders/directories in the digital front end (DFE) of the printer to determine the list of available control parameters such as emulations and/or source profiles. These are then used to populate, for example, the emulation or source field 202 of the interface 200. For each of the control parameters, e.g. emulations and source profiles, the input module also checks the available settings. This data is then used to populate, for example, the settings fields (204, 206, 208, 210, 212, 214, 222, 224, 226, 228) of the interface 200. In one form, checkboxes are provided to allow the user to select which settings of emulations/sources and rendering intents are to be used in the test job. These checkboxes are illustrated in FIG. 3. The data used to populate the fields 202 and 220 may be manually input as well.

It should also be understood that the pre-press operator can select the parts of the document on which the test job will be run. This selection could be made with an application similar to a PDF viewer/browser that could identify the individual elements comprising the PDF document. Selections would be made using the mouse and/or keyboard. The operator could select the entire document, a set of pages within the document or a selection of individual images, graphics or text.

The user is able to make user selections within the field 202 and the field 220, which are indicated by manipulating, for example, a mouse or other keyboard control. When the control parameters such as the emulations/sources and rendering intents and their available settings have been selected, combinations of the selected elements of the fields are constructed (at 304). In one form, descriptive text for each combination is developed (at 306). A job is then constructed in which the selected sections of the document are processed (at 308) and printed (at 312) using each of the selected combinations of emulation/source and rendering intent. Appropriate labels are also optionally included in the job to identify the different emulations and rendering intents (at 310). Incorporation of these labels, e.g., descriptive text, may be accomplished using a variety of known techniques. The pre-press operator can then compare, for example, the various emulations and rendering intents to select the one that represents the best choice for printing the document.

This presently described embodiments save considerable time for a print shop when determining, for example, the most appropriate emulation or source profile and rendering intent for a print job supplied in an unknown or generic color space. The prior art methods require many single jobs to be created and printed with adjustments to various settings being made for each job. Adjusting the settings and printing the individual jobs requires the pre-press operator to navigate through several screens. Furthermore, there is a time delay associated with ripping the job and printer warm up associated with each individual job. During this entire process, it is difficult to use the digital press for other jobs. The time saved by this presently described embodiment will lead to greater press utilization and, therefore, higher productivity and profitability for the press owner.

An additional benefit of the presently described embodiments is that it would reduce the level of tedium and frustration experienced by the pre-press operator leading to higher job satisfaction.

Another benefit is that the presently described embodiments reduce the chances of error by creating labeled test pages clearly identifying the emulation/source and rendering intent used for each test. The prior art system places the onus on the pre-press operator to accurately label each test print.

Another benefit of the presently described embodiments is that the concept is easily extended to other parameters beyond emulation/source and rendering intent. Halftone screen, GCR/UCR settings and many other variables could be tested by extending the presently described embodiment.

In addition, the presently described embodiments provide a number of significant advancements over that which is known. These advantages include:

1. Only control parameters and settings, such as emulations/sources and rendering intents, that are actually available to the printer are tested.

2. The test is fully automated and generates all required results in a single print job.

3. The presently described embodiments generate test prints on the actual press Actual press results are more accurate than proofing results for many applications.

4. The presently described embodiments provide labeled test prints in which multiple tests can be compared visually side by side. Such comparisons are difficult if not impossible using softcopy proofing.

Other alternatives to the presently described embodiments include the suppression of text. In this regard, text may be suppressed in any given document during the processing stage.

Moreover, as illustrated by way of example, the emulation or source files may be used as control parameters. Likewise, rendering intent may be used as a second control parameter. However, as noted above, it should be appreciated that various types of data may be used in connection with the printing process. For example, as noted, factors for any given printer may be extracted from the control system of the printer. In this way, the software routines of the presently described embodiments would interact with the raster image processor of the printer to be able to extract appropriate data and present such data to a user. Another alternative would include the masking of certain options for certain users. Such a system would take into account the sophistication of any given user.

In still a further alternative, the user selections may be saved so that files can be built-up for particular applications of the presently described embodiments. For example, user selections for a particular printing customer may be saved in a folder or a queue so that they can simply be retrieved for the next job for that customer.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A color adjustment method for use with a document rendering device operative to render and print a document, the method comprising:
   providing a first interface operative to receive a first user selection of a plurality of control parameters from a plurality of control parameters available in the rendering device;
   providing at least a second interface operative to receive a plurality of settings for at least one of the control parameters selected in the first interface;
   constructing selected combinations of the control parameters and settings;
   processing the document for each combination to obtain a plurality of processed documents; and,
   printing the processed documents.

2. The method as set forth in claim 1 wherein the plurality of control parameters includes one or more control parameters related to the color interpretation of document source or emulation data.

3. The method as set forth in claim 1 wherein the plurality of control parameters includes one or more control parameters related to rendering intents.

4. The method as set forth in claim 1 wherein the constructing is based on a full factorial design.

5. The method as set forth in claim 1 wherein the constructing is based on a fractional factorial design.

6. The method as set forth in claim 1 further comprising developing descriptive text corresponding to each of the combinations and inserting the corresponding descriptive text into or adjacent to, each of the processed documents.

7. The method as set forth in claim 1 wherein the document is an image.

8. The method as set forth in claim 1 wherein the processing is performed on a selected region of a document.

9. The method as set forth in claim 1 further comprising suppressing text in the document during the processing.

10. The method as set forth in claim 1 further comprising extracting the plurality of available control parameters and plurality of available control parameter settings from the document rendering device.

11. The method as set forth in claim 1 further comprising storing the control parameter selection and the control parameters settings selection.

12. The method as set forth in claim 1 further comprising allowing the selection of discrete settings of a control parameter through the second interface.

13. The method as set forth in claim 1 further comprising allowing selection of a range of settings for a continuous control parameter through the second interface.

14. The method as set forth in claim 1 wherein providing the first interface and providing the at least second interface comprises providing the first and second interface as a single interface or on a single screen.

15. A color adjustment system for use with a document rendering device operative to render a document, the system comprising:
   a first interface operative to receive a first user selection of a plurality of control parameters from a plurality of control parameters available in the rendering device;
   at least a second interface operative to receive a plurality of settings for at least one of the control parameters selected in the first interface
   a first processing module operative to construct selected combinations of the selected control parameters and settings;
   a second processing module operative to process the document for each said combination to obtain a plurality of processed documents; and,
   a print engine operative to print the processed documents.

16. The system as set forth in claim 15 wherein a first control parameter relates to the color interpretation of document source or emulation data.

17. The system as set forth in claim 15 wherein the plurality of control parameters includes one or more control parameters related to rendering intents.

18. The system as set forth in claim 15 wherein the first module is operative to construct combinations using a full factorial design.

19. The system as set forth in claim 15 wherein the first module is operative to construct combinations using a partial factorial design.

20. The system as set forth in claim 15 wherein the processing module is operative to develop a descriptive text corresponding to each of the combinations and inserting the corresponding descriptive text in, or adjacent to each of the processed images.

21. The system as set forth in claim 15 wherein the document is an image.

22. The system as set forth in claim 15 wherein the processing is performed on a selected region of a document.

23. The system as set forth in claim 15 wherein the second processing module is operative to suppress text in the document.

24. The system as set forth in claim 15 further comprising a means for extracting the plurality of available control parameters and the plurality of available control parameter settings from the document rendering device.

25. The system as set forth in claim 15 further comprising libraries storing the first control parameter selections and the control parameter settings selections.

26. The system as set forth in claim 15 wherein the first interface and the second interface are provided as a single interface or on a single screen.

\* \* \* \* \*